Oct. 5, 1965 F. J. KNIGHT 3,209,964
DISPENSER-CONTAINER
Filed Sept. 30, 1963
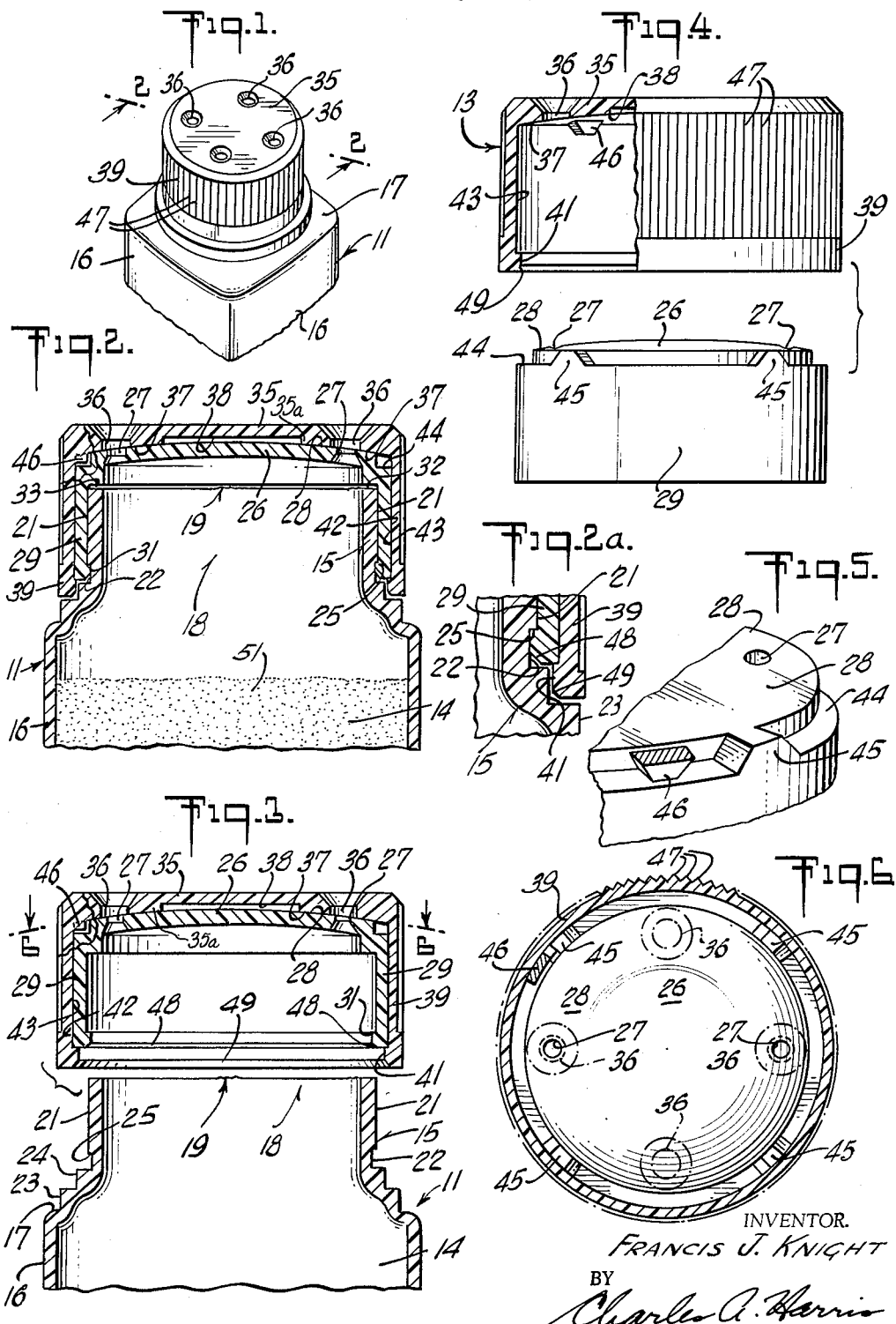
INVENTOR.
FRANCIS J. KNIGHT
BY
Charles A. Harris
ATTORNEY United States Patent Office 3,209,964
Patented Oct. 5, 1965

3,209,964
DISPENSER-CONTAINER
Francis J. Knight, New Brunswick, N.J., assignor to Johnson & Johnson, a corporation of New Jersey
Filed Sept. 30, 1963, Serial No. 312,569
2 Claims. (Cl. 222—545)

The present invention relates to sifter containers for powder, more particularly to containers of this type with a twist cap having dispensing openings intended to be twisted in and out of registry with corresponding openings in a sifter member positioned across the mouth of the container for opening and closing the dispenser.

Attempts have been made to construct such a container entirely from molded plastic parts since such parts are free from rust and do not seize when in engagement with one another. Furthermore, they provide a relatively inexpensive yet attractive structure. Since it is desirable to construct the body of a container of this type with a relatively large chamber to hold a large enough quantity of powder and with a much smaller neck to minimize the sifting area, it is impossible to form the container body in one piece by normal injection molding techniques wherein a core is used to form the chamber. This is especially true since the neck of the container must be left open for filling the container body and then closed by positioning an inner sifter member or cap across the opening. As a result the body of the container must be formed at least in part by a blow-molding process wherein a plastic blank is inserted in the mold, heated and then blown outwardly until the outside surface of the blank conforms with the shape of the inside of the mold. In blow molding, it is possible to obtain a relatively exact dimension transversely of the mold, i.e., radially in the case of a cylinder, but exact axial dimensions are not obtainable without subsequent trimming or machining because the excess plastic is merely squeezed off at the mouth of the mold and because curved fillets tend to form in shoulders, grooves, and other irregularities in the sides of the mold. Similarly exact inside dimensions are not attainable in blow-molding without an additional reaming or sizing step.

In powder containers of the type described, it is necessary that the container neck, the inner sifter member, and the outer cap be exactly dimensioned with respect to one another to assure that the cap may be twisted easily on the container to open and close the dispensing openings and that the container remains sealed when the dispensing openings are closed. Heretofore, it has been necessary either to injection mold all of these parts for this purpose, or to injection mold the two caps and size or ream out the inside of the container neck after the body of the container has been blow-molded. The first-mentioned technique requires the use of a somewhat complex and expensive process for forming the container body wherein the neck is at least partially injection molded and the chamber is blow-molded, whereas the second involves the inconvenience and expense of reaming or sizing.

According to this invention an inexpensive all plastic, molded sifter dispenser-container for powder is provided which comprises an entirely blow-molded container body and injection molded inner and outer sifter caps which snap onto the container neck. The inner and outer caps may be assembled easily on the neck of the container in such a way that they may be rotated easily with respect to one another to open and close the dispensing openings and yet provide a positive seal which prevents any powder from escaping from the container except through the dispensing openings and then only when the openings are registered with one another. The container neck is blow-molded in such a way as to prevent a cylindrical outer sealing surface having a substantially exact outer diameter, i.e., radial dimension, but with inexact axial dimensions due to the above-mentioned limitations of the blow-molding process. The inner cap is molded with an inside diameter normally less than the outside diameter of the cylindrical sealing surface of the neck, and is adapted to be distended radially outwardly to allow the cap to be pressed over and snapped onto the neck with a radial interference fit between the inner cap and the sealing surface of the neck. This interference fit normally holds the inner cap in a fixed position on the container neck. However, cooperating retaining means are provided on the neck and the inner cap to prevent accidental axial displacement of the the cap off the neck under extreme conditions. To provide for the inexact axial dimensions of the neck, the axial dimension of the neck portion between the end surface of the neck immediately surrounding the container mouth and the retaining means on the neck is normally sufficiently less than the axial dimension of the space provided in the inner cap for accommodating said neck portion.

The inner cap comprises an inner dispensing wall extending radially across the mouth of the container and a resilient gripping ring which snaps onto the neck of the container as described above. The dispensing wall of the inner cap defines a set of spaced dispensing openings and inner sealing surfaces surrounding said openings. The outer cap comprises a corresponding outer dispensing wall defining a corresponding set of spaced dispensing openings adapted to register with the dispensing openings of the inner dispensing wall and having outer sealing surfaces adapted to cooperate with the inner sealing surfaces of the inner cap to seal off the dispensing openings when the caps are turned so that the openings are out of registry with one another. The outer cap also comprises a resilient cylindrical rim which extends axially from the outer dispensing wall over the gripping ring of the inner cap, and positioning means on the cylindrical rim for cooperating with the gripping ring for rotatably mounting and holding the outer cap on the inner cap and positioning the outer sealing surfaces of the outer cap in axial sealing contact with the inner sealing surfaces of the inner cap.

Preferably, the cooperating retaining means on the inner cap and the container neck are in the form of a flange extending radially inwardly from the gripping ring of the cap and an annular recess in the container neck, respectively; and the positioning means on the cylindrical rim of the outer cap is in the form of a flange extending radially inwardly from the cylindrical rim which cooperates with the inner end of the gripping rim of the inner cap for pulling the inner and outer sealing surfaces of the cap into axial sealing contact with one another as described above.

Thus, the inner and outer caps of the dispenser-container of this invention may be assembled easily on the neck of the container body merely by pressing the caps onto the neck until the inner cap snaps into position on the container neck and the outer cap snaps over the inner cap. The outer cap may be snapped onto the inner cap before the inner cap is snapped over the container neck, or the inner cap first may be snapped onto the container neck. At any rate, as soon as the two caps are assembled on the container, the container is positively sealed closed until the outer cap is rotated with respect to the inner cap to a point where the dispensing openings in the cap are at least partially in registration with one another. To assure simple and relatively automatic registration of the dispensing openings in the inner and outer caps, stops preferably are provided to determine the open and closed rotative positions of the outer cap with respect to the inner cap.

Other and further advantages of the invention will occur to one skilled in the art from the following description and claims taken together with the drawings wherein:

FIG. 1 is a view in perspective of a container-dispenser according to a preferred embodiment of this invention with the bottom of the container cut away to facilitate arrangement of the figures;

FIG. 2 is an enlarged view partly in section and partly in elevation taken along the line 2—2 of FIG. 1 and partly broken away to show the stop on the outer cap;

FIG. 2a is a more greatly enlarged sectional view showing the retaining means on the inner cap and the neck of the container as well as the positioning means on the outer cap;

FIG. 3 is an enlarged view similar to FIG. 2 and showing the inner cap in position in the outer cap prior to assembly of the inner cap on the neck of the container;

FIG. 4 is an enlarged view in elevation of the inner and outer caps of the dispenser of the preceding figures illustrating the caps prior to assembly and the outer cap partly broken away to show the construction of one side of the outer cap in section;

FIG. 5 is a more greatly enlarged view in perspective of a portion of the inner cap of this dispenser;

FIG. 6 is an enlarged view partly in plan and partly in section taken along the line 6—6 of FIG. 3.

Referring to the drawings, there is shown on all plastic molded sifter dispenser-container for powder according to a preferred embodiment of this invention, which comprises an entirely blow-molded container body 11, an injection molded inner cap 12 and an injection molded outer cap 13.

The container body comprises an oblong powder chamber 14 and a narrow container neck 15 at the top of the chamber. The chamber is defined by side walls 16, a bottom wall, not shown, molded integrally therewith, and a top wall 17 molded integrally with the container neck 15. The neck presents a filling opening 18 at the mouth 19 of the container body and a cylindrical sealing surface 21 surrounding the filling opening and extending axially of the neck away from said mouth 19 along the outside of the neck. The cylindrical sealing surface 21 terminates in a rectangular annular retaining groove 22 extending radially inwardly of the sealing surface and around the neck 15. The neck 15 is connected to the top wall 17 of the container body by a pair of stepped shoulders 23 and 24 below the annular retaining groove, and the groove 22, itself, includes a retaining shoulder 25 contiguous with the sealing surface 21.

The inner cylindrical cap 12 is adapted to be fixed in position on the neck 15 of the container and comprises a radially extending inner dispensing wall 26 which defines a set of four inner dispensing openings 27 spaced from one another and arranged angularly approximately 90° apart about the axis of the neck. The dispensing wall 26 of the inner cap is domed shaped i.e., it is curved on a fairly large radius so as to present slightly convex inner sealing surface portions 28 surrounding each of the inner dispensing openings 27. A resilient cylindrical gripping ring 29 extends inwardly from the inner dispensing wall 26 over the cylindrical sealing surface 21 of the neck 15 in tight fitting relationship therewith in such a way as to provide an interference fit between the inner surface of the gripping ring 29 and the sealing surface 21 of the neck. This interference fit normally holds the inner cap 12 in a fixed position on the neck 15. However, to assure that the inner cap is not displaced from the neck under extreme conditions, an inwardly extending annular retaining flange 31 is provided at the inner end of the gripping ring 29 for snapping into the retaining groove 22 on the neck.

Due to the blow-molding process, the end surface 32 of the neck immediately surrounding the container mouth is somewhat irregular and the axial dimensions of the neck are somewhat inexact, even though the outside diameter of the sealing surface 21 of the neck can be determined with sufficient precision to assure that an interference fit is obtained between the sealing surface 21 and the gripping ring 29 of the inner cap 12, as described above. To provide for variations in the axial dimensions of the neck 15, the axial dimension of the container neck portion between the end surface 32 of the neck immediately surrounding the container mouth 19 and the annular retaining groove 22 is designed to be normally sufficiently less than the axial dimension of the space provided in the inner cap 12 for accommodating this neck portion. This may result in a slight axial clearance 33 between the end surface of the neck and the adjacent axially spaced portion of the inner cap, as shown in FIG. 2.

The outer cap 13 is intended to be rotatably mounted on the inner cap 12 and comprises a generally flat radially extending outer dispensing top wall 35 with a downwardly projecting portion 35a on the undersurface thereof in which there is located a corresponding set of four spaced outer dispensing openings 36 adapted to register with the inner dispensing openings 27 of the inner cap. The dispensing openings 36 in the outer cap are also arranged angularly approximately 90° from one another about the axis of the neck 15, and the outer cap 13 presents sealing surfaces 37 at the bottom of the projecting portion 35a surrounding the outer dispensing openings 36 for cooperating with the underlying sealing surfaces 28 of the inner cap 12. The sealing surfaces 37 are curved slightly on the same radius as the inner sealing surface portions 28 so that they may be drawn into sealing contact therewith all around the dispensing openings 27 and 36. A circular recess 38 is provided on the underside of the center of the outer cap 13 so that the outer cap does not contact the inner cap 12 adjacent the axis of the container. This assures a concentration of axial pressure at the sealing surfaces 28 and 37 around the dispensing openings 27 and 36 when the caps are drawn into axial contact with one another.

A resilient cylindrical rim 39 extends axially from the dispensing wall 35 of the outer cap 13 over the gripping ring 29 of the inner cap and terminates in a positioning flange 41 which snaps over the inner end of the gripping ring 29 of the inner cap. The inner cap 12 presents a cylindrical outside surface 42 for rotatively supporting the outer cap 13 and the outer cap presents an inner cylindrical bearing surfaces 43 for riding on the supporting surface 42. The inside diameter of the bearing surface 43 is approximately equal to or slightly greater than the outside diameter of the supporting surface 42 of the inner cap to allow the outer cap to rotate freely on the inner cap. The positioning flange 41 is spaced from the outer sealing surfaces 37 on the inside of the outer dispensing wall 35 of the outer cap so that, when the positioning flange is snapped over the end of the gripping ring 29 on the inner cap, the outer sealing surfaces 37 of the outer cap are drawn into a slight interference fit with inner sealing surface portions 28 of the inner cap to provide sealing contact therewith. To state it differently, the concentration of force acting through the sealing surfaces 37 tend to deform the underlying dome shaped cap as determined by said interference fit so that when the outer cap 13 is snapped into postion on the inner cap 12 and the respective dispensing openings 27 and 36 of the two caps are out of registery with one another, the caps provide a positive seal at the mouth 19 of the container which prevents powder from sifting therethrough.

An annular recess 44 is provided around the periphery of the inner cap 12 immediately surrounding the sealing surface portions 28 of the cap and a set of four truncated inner stops 45 are located on the ridge approximately 90° angularly from one another about the axis of the cap. A single correspondingly truncated outer stop 46 depends from the inside of the outer dispensing wall 35 of the outer cap 13 for cooperating with the stops 45 on the inner cap for easily determining the relative positions of the caps wherein their respective dispensing openings are in and out of registry with one another, as will be explained more fully hereinafter. The outside cylindrical surface of the outer cap 13 comprises a series of axial serrations 47 to facilitate gripping the cap when rotating it for opening and closing the dispenser.

As shown most clearly in FIG. 2a, the inside leading edge of the retaining flange 31 on the inner cap 12 is inclined to provide a cam surface 48 for distending the retaining flange 31 and the gripping ring 29 radially outwardly when the inner cap is pressed onto the neck 15 of the container to the extent necessary to allow the retaining flange and the gripping ring to pass over the sealing surface 21 of the neck to a point where the retaining flange 31 snaps into the retaining groove 22 in the neck. Similarly the inside leading edge of the positioning flange 41 on the outer cap 13 is inclined to provide a cam surface 49 for distending the positioning flange 41 and the cylindrical rim 39 of the outer cap radially outwardly when the outer cap is pressed onto the inner cap. The positioning flange 41 and the cylindrical rim 39 of the outer cap 13 also are sufficiently resilient that the positioning flange 41 will snap over the end of the gripping ring 29 when the outer cap is pressed firmly over the inner cap. Due to the close fit between the positioning flange 41 and the inner end of the gripping ring 29, the outer cap is designed to be pressed onto the inner cap by the application of firm axial forces. Since the inner and outer caps both are injection molded to relatively close tolerances, this method of assembly is used to assure that enough of an interference fit is obtained between the respective sealing surfaces 28 and 37 of the inner and outer caps to assure sealing contact between these surfaces in the area surrounding the dispensing openings 27 and 36.

The dispenser-container of this invention may be assembled by first positioning the outer cap 13 on the inner cap 12 and then pressing the assembly formed by two caps into position on the neck 15 of the container, as illustrated in FIG. 3. On the other hand, the inner cap 12 may first be snapped into position on the neck 15 of the container, following which the outer cap 13 may be pressed into position over the inner cap to complete the assembly.

Regardless of the order of assembly of the caps with respect to the body of the container, the container chamber 14 is filled with powder 51 prior to positionng the inner cap on the container neck. When the inner cap 12 is snapped into position on the container neck 15, a positive seal is provided between the gripping ring 29 of the inner cap and the sealing surface 21 of the neck which prevents any powder from leaving the container chamber 14 except through the dispensing openings 27 in the inner cap. Then, as explained hereinbefore, once the outer cap 13 is fitted on the inner cap 12, powder can only leave the dispenser when the dispensing openings 36 of the outer cap are in registry with the dispensing openings 27 of the inner cap.

The four inner stops 45 on the inner cap 12 are located with respect to the four dispensing openings 27 in the inner cap, the single outer stop 46 on the outer cap 13 and the four dispensing openings 36 in the outer cap in such a way that, when the outer stop 46 is moved in one direction into contact with the next adjacent inner stop 45, the dispensing openings 27 and 36 in the two caps will be completely out of registry with one another and, when the outer stop 46 is moved in the opposite direction into contact with the next adjacent inner stop 45 the dispensing openings in thhe two caps will be exactly in registry. This is true regardless of which two of the four inner stops 45 act to limit the rotative movement of the outer stop 46. The provision of only one outer stop on the outer cap 13 facilitates assembly of the caps since it is extremely unlikely that the single outer stop 46 will enter into exact registry with one of the inner stops 45 and thereby temporarily retard axial assembly of the caps.

The container body 11 and the inner and outer caps 12 and 13 may be formed of any suitable plastic material which is capable of being blow-molded, in the case of the body, and injection molded, in the case of the two caps; provided that the caps when molded possess sufficient resiliency to snap into position as described above and sufficient firmness to retain the necessary seals to assure that the container will remain tight and leak-proof. The container body need not be as resilient or flexible as the caps. For this reason, in a preferred embodiment of this invention the body is molded from high density polyethylene and the inner and outer caps are molded from medium density polyethylene.

Having now described the invention in specific detail and exemplified the manner in which it may be carried into practice, it will be readily apparent to those skilled in the art that innumerable variations, applications, modifications and extensions of the basic principles involved may be made without departing from its spirit or scope.

The invention claimed is:

1. A dispenser-container with sifter top which comprises an entirely blow-molded plastic container having a cylindrical neck portion, an external sealing surface extending downwardly along the outside of said neck portion, and a first retaining means associated with said sealing surface spaced at a given selected linear dimension axially downwardly from the top of said neck portion; a cylindrical inner cap having a top wall dispenser portion extending convex outwardly, a resilient ring portion integral with the top wall portion and a second retaining means integral with said ring portion and cooperating with said first retaining means to prevent axial displacement of said cap off said container neck, said resilient ring portion having an inner surface whose radial dimension provides a radial interference fit with the sealing surface of the container neck so as to grip said container neck and prevent relative rotation between said neck and said inner cap, and whose axial dimension along said inner surface is sufficient to accommodate said selected linear dimension of the container neck between the top edge thereof and said first retaining means plus any variation in such dimension normally to be expected from the blow-molding operation; and a cylindrical outer cap coaxially disposed with respect to said inner cap and equipped with a top wall dispenser portion presenting a centrally disposed top wall section of given thickness spaced from the underlying top wall portion of the inner cap and an outer marginal portion of greater thickness having a bottom surface complementary to and disposed in contact with a corresponding outwardly convex surface portion on the top wall portion of the inner cap so as to form sealing means therewith, dispensing openings correspondingly disposed and angularly spaced both in the thicker marginal portion of said outer top wall dispenser portion and in the inner top wall dispenser portion and adapted to be moved into and out of registry upon relative rotation of said inner and outer cap members, a cylindrical ring portion extending in an axial direction downwardly from said outer top wall dispenser portion and presenting an internal surface located adjacent and relatively rotatable with respect to an external surface on the ring portion of the inner cap, and positioning means on said ring portion acting substantially uniformly around the periphery of said inner cap for maintaining the sealing surface means of said outer and inner cap members resiliently against axial movement out of sealing contact throughout the relative rotation of said inner and outer cap members to move the dispensing openings thereof into and out of registry.

2. A dispenser-container with sifter top which comprises a container body having a cylindrical neck portion, an external sealing surface extending downwardly along the outside of said neck portion, and a first retaining means associated with said sealing surface spaced downwardly from the top of said neck portion; a cylindrical inner cap having a dome shaped top portion, a resilient ring portion integral with and extending downwardly from said top portion and a second retaining means integral with the resilient ring portion and cooperating with said first retaining means to prevent axial displacement of said cap off said container neck, said resilient ring portion having an inner radical dimension providing a radial interference fit with said sealing surface of the neck portion normally to grip said neck portion and prevent relative rotation therebetween; and a cylindrical outer cap coaxially disposed with respect to said inner cap and equipped with a top wall dispenser portion, a resilient cylindrical ring portion integral therewith and extending in an axial direction downwardly from said top wall dispenser portion and presenting an internal surface adjacent and relatively rotatable with respect to an external surface on the ring portion of the inner cap; said top wall dispenser portion being relatively flat and having downwardly projecting means presenting sealing surfaces complementary to and disposed in contact with sealing surfaces on the dome portion of said inner cap member, dispensing openings correspondingly disposed and angularly spaced in the dome portion of the inner cap member and in the downwardly projecting means of the outer cap member and adapted to be moved into and out of registry upon relative rotation of said inner and outer cap members, and means on the cylindrical ring portion of the outer cap member acting substantially uniformly around the periphery of said inner cap member for relatively positioning the cap members in an axial direction, the dimensions of the outer cap member between said positioning means and the sealing surfaces presented by the projecting means thereon being such as to provide an interference fit between said complementary sealing surfaces whereby to present a concentration of force tending to deform the surface of the underlying dome member and create a positive seal between said complementary surfaces when the dispensing openings are out of registry.

References Cited by the Examiner

UNITED STATES PATENTS

| | | | |
|---|---|---|---|
| 2,064,189 | 12/36 | Bodor | 222—548 |
| 2,088,607 | 8/37 | Peters | 222—548 |
| 2,155,606 | 4/39 | Lewis | 222—142.9 |
| 2,281,620 | 5/42 | Rueger | 222—548 |
| 2,619,266 | 11/52 | McDonald | 222—548 |
| 2,817,451 | 12/57 | Giles et al. | 222—548 X |
| 2,943,771 | 7/60 | Driscoll | 222—548 X |
| 3,029,003 | 4/62 | Gronemeyer | 222—548 X |
| 3,058,630 | 10/62 | Abt | 222—548 |

FOREIGN PATENTS 999,394    1/52    France.

RAPHAEL M. LUPO, *Primary Exmainer.*

LOUIS J. DEMBO, *Examiner.*